United States Patent [19]

Sahagun-Barragan

[11] 4,177,946

[45] Dec. 11, 1979

[54] INTEGRAL DRIP IRRIGATION SYSTEM

[76] Inventor: Jaime Sahagun-Barragan, Calle del Teco 287, Zamora, Mich., Mexico

[21] Appl. No.: 889,398

[22] Filed: Mar. 23, 1978

[30] Foreign Application Priority Data

Apr. 11, 1977 [MX] Mexico ................................ 168682

[51] Int. Cl.$^2$ ............................................. B05B 15/00
[52] U.S. Cl. .................................. 239/533.1; 239/542
[58] Field of Search ............ 239/107, 108, 109, 533.1, 239/542

[56] References Cited

U.S. PATENT DOCUMENTS

| | | | |
|---|---|---|---|
| 3,896,999 | 7/1975 | Barragan | 239/542 X |
| 4,011,893 | 3/1977 | Bentley | 239/542 X |
| 4,105,162 | 8/1978 | Drori | 239/542 X |

FOREIGN PATENT DOCUMENTS

| | | | |
|---|---|---|---|
| 2607563 | 9/1976 | Fed. Rep. of Germany | 239/542 |
| 2657695 | 7/1977 | Fed. Rep. of Germany | 239/542 |
| 197806 | 6/1978 | France | 239/542 |

*Primary Examiner*—John J. Love
*Attorney, Agent, or Firm*—Darby & Darby

[57] ABSTRACT

An integral drip irrigation system comprises an elongated laminate which forms an integral part of a pipe for carrying drip irrigation liquid and is constituted by a plastic flexible sheet, thermally deformed to provide the same with at least one winding channel running along the same; at least one irrigation liquid admitting or collector zone capable of feeding the same through one end of said at least one channel; at least one irrigation liquid emitter zone located at the other end of said at least one channel; and a flat flexible plastic sheet adhered to said thermally deformed sheet at the upper areas thereof, for completing the passages and collector and emitter zones, said flat sheet acting as a pressure compensating diaphragm on said at least one emitter zone, while it acts as an irrigation liquid filtration system by means of the provision of at least one slit or hole in the same at said at least one irrigation liquid collector zone.

The laminate may be wrapped in any direction and may be sealed at its side edges in order to form a flexible pipe, or it may alternatively be used as an element adhered to an existing pipe, wherein openings coincident with the filtration system of said at least one irrigation liquid collector zone are provided.

11 Claims, 13 Drawing Figures

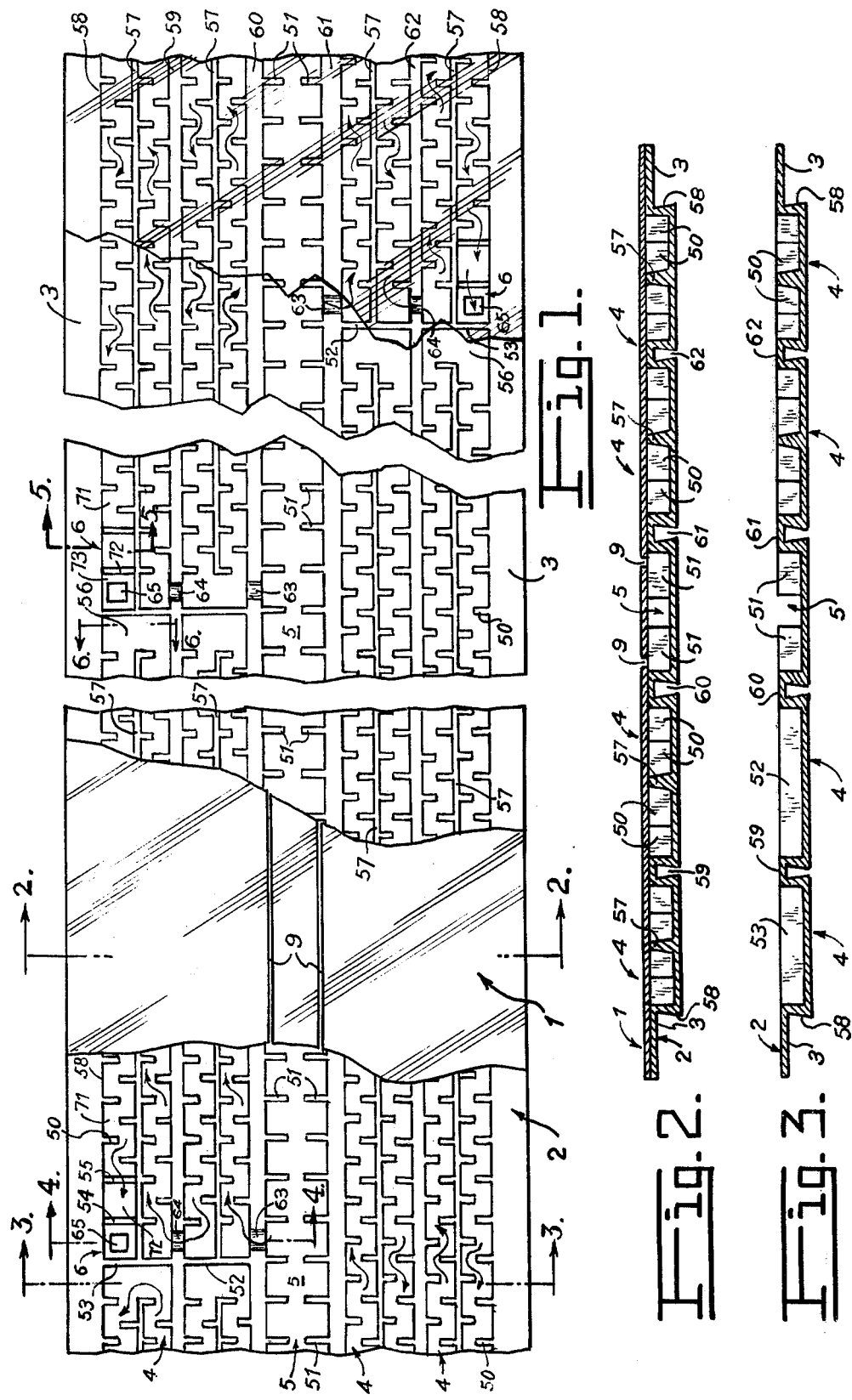

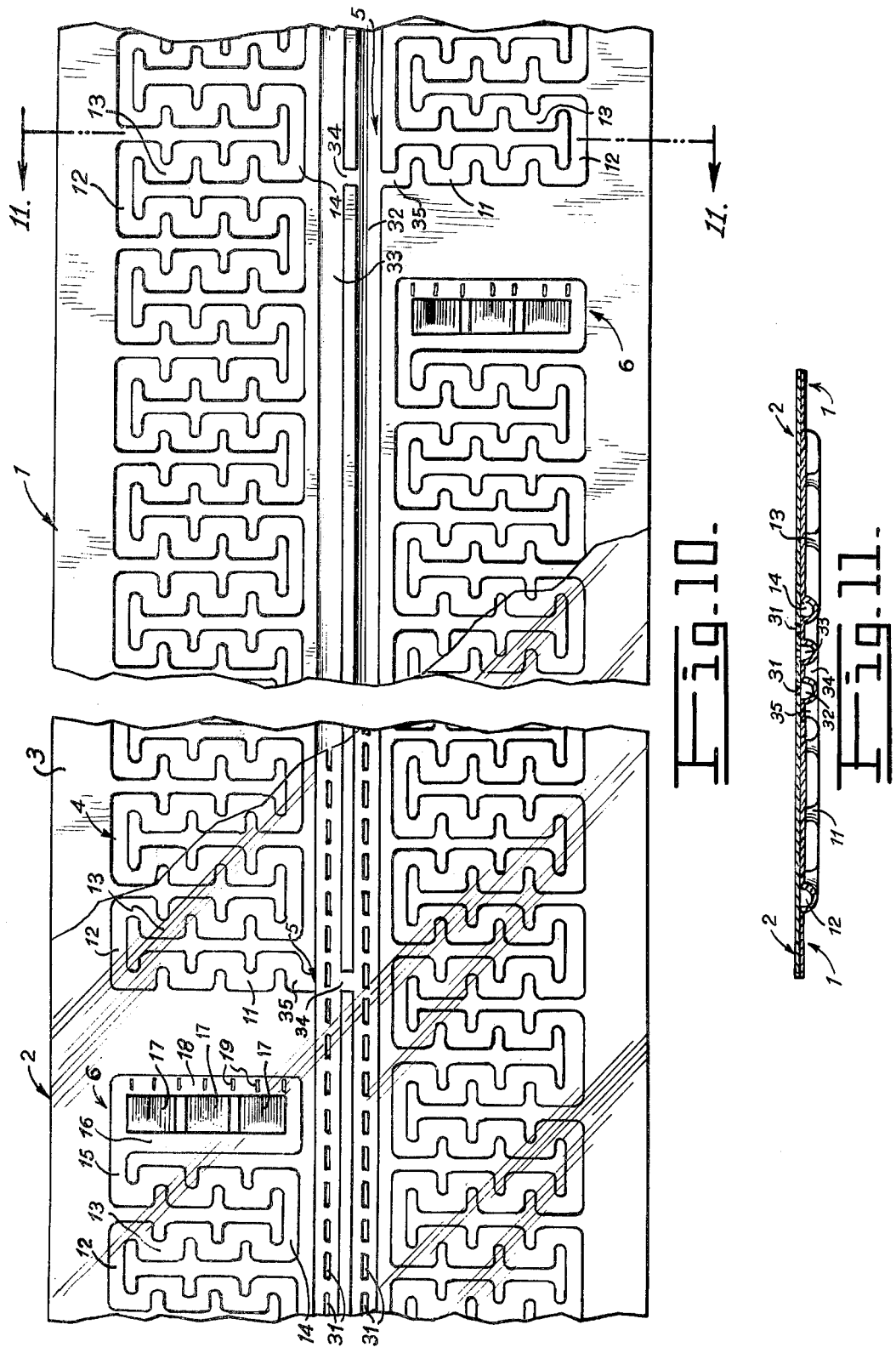

INTEGRAL DRIP IRRIGATION SYSTEM

BACKGROUND OF THE INVENTION

The present invention refers to a drip irrigation system and, more particularly, it is related to an integral drip irrigation system which, without the need of any auxiliary devices, contains integrally therein all the necessary elements for providing filtration, admission, flow control and pressure compensation and emission of the irrigation liquid in the appropriate places.

As is well known, a drip irrigation system is an irrigation system which has received great encouragement in recent years and for which the most accepted definition is that which states that it comprises the slow and frequent application of water or special irrigation liquids to the plants by means of mechanical devices called emitters. The above is generally effected in practice by means of the use of pipes of several materials, preferably plastic piping, which are laid along the plant rows or furrows and to which the emitters are applied in the proper places, said emitters having as their function to regulate the delivery of water to render it a slow one.

It must be pointed out that, the higher the number of plants in a row, the higher will be the amount of emitters that must be coupled to the corresponding pipe and, consequently, the higher will also be the resulting cost, which ocassionally reaches excessive levels such as in very dense crops, for instance, corn.

In view of the serious drawbacks shown by the prior art drip irrigation systems using individual emitters, the latter have been substantially abandoned and, in lieu thereof, special types of pipes have been designed for application in furrows. In these special types of pipes the conventional emitters are replaced by small bores or holes integrated to the wall of the pipe, thereby avoiding the cost of the emitter itself, inasmuch as it is the wall of the pipe proper which acts as such an emitter, whereby a considerable economy is achieved which renders the practice of drip irrigation practicable for furrow crops.

At present there are several known classes of this type of special pipe, among which there may be mentioned the single wall pipe which comprises a common pipe having a periodical series of minute bores through which the water flows outwardly of the pipe. Also very well known are the double wall pipes which comprise a two-wall pipe, having an inner wall and an outer wall, which inner wall contains said periodical series of minute perforations, whereas the outer wall has several times as many perforations, in order to thusly appropriately distribute the water received from the bores in the inner wall and deliver it to the environment.

Still a third type of drip irrigation pipe that are very well known in the prior art for use in furrows crops, is described in U.S. Pat. Nos. 3,873,030, 3,870,236 and 3,896,999 which will be mentioned as references in more detail hereinbelow, and which disclose systems comprising irrigation pipes having adhered to their wall a pressure reducing element which comprises a winding passage which prevents the advantage that it is clogged with considerable more difficulty than the prior art known pipes described above, inasmuch as the cross sectional area of the winding passages may be quite larger than is the case of the mere bores and inasmuch as suitable devices are provided to unclogg such passages if necessary.

Regardless of the above, it is a very well known condition that all the drip irrigation pipes known heretofore, including those described in the U.S. patents mentioned above, get clogged very easily because of the introduction of solid matter contained in the water and none of them has been provided with an integrated filtration system to avoid such clogging, whereby it is always necessary to aid these systems with very costly separate filtration units to remove the impurities contained in the vast majority of the waters and farming liquids, prior their feeding to the drip irrigation pipes. Therefore, the clogging difficulties constitute the most difficult, costly and persistent problem that remains to be solved in drip irrigation systems.

One other serious problem of all the drip irrigation pipes of the prior art is the fact that in all of them the flow varies at the outlets or emitters in response to fluctuations in pressure caused by variations in the pressure of the source or in view of the mere topography of the land where said emitters are located.

On the other hand, such as is also well known in the art of installing drip irrigation systems, those systems which use long networks of pipes provided with droppers or individual emitters that have to be controlled also individually, have been abandoned in favor of the systems achieving flow reduction of the irrigation liquid by means of friction loses through elongated passages and more particularly through winding passages that are more easily controllable.

Even when there are many and diverse types of drip irrigation systems using the method of flow reduction of the irrigation liquid by means of friction loses or impacts against walls of winding passages, it must be pointed out that the two above described main problems have persisted up to the present date, and that said problems have not been solved by any one of the prior art drip irrigation systems, namely, the very important problem caused by variations in pressure that originate consequent to variations in the flow of liquid at the outlets of the system, and the serious problem caused by the clogging of the chambers and winding passages by solid matter admitted into the system.

It is of course to be noted that, by means of the provision of winding passages to cause friction loses by changes in the direction of flow of the liquid that is being carried therethrough, the cross sectional area of said passages has been considerably increased, whereby the problem of clogging of the passages has been also considerably decreased but even when the clogging occurs with less frequency, the problem still persists in all the prior art irrigation systems. Also, none of the prior art drip irrigation systems has been provided with pressure compensating devices, which causes the above mentioned problem of very considerable variations in the volume of irrigation liquid supplied by the emitter zones of the system, which in turn causes problems in the drip irrigation of certain crops with critical liquid requirements.

Among the very diverse drip irrigation systems built with winding passages that reduce the flow of the fluid by friction loses along the path of the irrigation fluid, it may be mentioned that in U.S. Pat. No. 3,873,030 owned by the same applicant hereof, there is described and claimed a drip irrigation device that, using novel winding passages, is capable of reducing the pressure of the liquid coming from the irrigation pipe by the provision of a passage which mainly works through impacts and very frequent and sharp direction changes, thereby partially solving the problem of clogging, inasmuch as the passages can be made having a much larger cross sectional area, whereby the obstruction thereof is considerably reduced while not completely avoided.

U.S. Pat. No. 3,870,236, also owned by the same applicant hereof, describes and claims a modified drip irrigation device that operates under the same above described principles but that may be manufactured in the form of a continuous band or ribbon having passages periodically formed thereon, to each one of which corresponds a bore of the drip irrigation pipe and from each one of which said liquid is emitted through a slit or hole placed at the opposite end of the winding passage.

While the device described and claimed in the above cited U.S. patents solved the problems of obstruction to a very important extent, the fact still remains that such drip irrigation devices do not contain an integrated filtration system, whereby the solid materials still can enter and flow through the admission zones of the winding passages and build up therein, whereby they may form serious obstructions. However, it must be pointed out that such obstructions occur with much less frequency than what could be expected from the devices working on friction loses and manufactured in accordance with the prior art. As the types of devices shown, described and illustrated in the above mentioned U.S. patents are normally integrally adhered to the pipe, when an obstruction occurs, it is relatively difficult to remove the same because, in order to achieve that goal, it will be necessary to disassemble the pipe and drip irrigation device, in order to remove the latter for the purpose of cleaning the same carefully before reutilization. In other words, in view of the fact that the pressure loss passage to which the drip irrigation liquid flows is integrally adhered to the wall of the pipe, it was generally impossible to unclog the device, whereby when any obstruction occured, this greatly affected the performance of the system.

In U.S. Pat. No. 3,896,999, also owned by the same applicant hereof, in order to remedy the drawbacks of the drip irrigation systems of the above described patents, a drip irrigation system was devised which incorporated the important aspects of having the winding passages manufactured by means of a highly flexible body of material, preferably coated with a flexible and resistant material, which enabled the user to collapse or squeeze the passage in any section thereof in order to loosen and release the possible obstructions that could have been possibly created in the system. This improved drip irrigation device also introduced the feature of providing a check valve which was opened by the drip irrigation liquid which was being discharged and which was closed when such pressure ceased to be exerted, whereby entrance of any foreign material from the environment and into the system was also avoided.

Regardless of the fact that the drip irrigation system of U.S. Pat. No. 3,896,999 described above solves many of the problems encountered with the drip irrigation devices prior to the advent of said invention, it must be pointed out that said device still does not solve the two essential problems that are up to now extant in all drip irrigation systems, namely, they nevertheless permit the entrance of foreign material entrained in the liquid into the passages, whereby the removal of such foreign material is required by means of squeezing or collapsing of the same, which represents a certainly difficult operation in most of the cases and is ocassionally also inefficient in view of the fact that the pipes are generally underground. Also, this system still does not solve the problem of regulating the volume of irrigation liquid emitted, when the pressure of the passages for such liquid varies in view of the pressure changes in the source of said liquid.

On the other hand, substantially all the prior art drip irrigation systems essentially relied on the provision of a winding passage member formed as a molded solid body, either rigid or flexible, manufacture of which was relatively costly and difficult and for which excessive amounts of plastic moldable material were required, whereby said systems could not be considered as truly integrated drip irrigation systems, and could not be manufactured in series by means of simple lamination and molding procedures. Therefore, they still contain integrated filters to avoid the entrance of foreign matter to the winding passages and also for compensating variations in pressure of the irrigation liquid in order to avoid variations of the volumes of liquid discharged through the emitters, thus rendering said systems practically uncontrollable.

The only manner available to solve the above problems, particularly the two essential problems that still persist in all the prior art drip irrigation systems, was to combine said systems with independent and separate filtration systems that guaranteed that the irrigation liquid sent to the distribution networks was perfect and absolutely clean to avoid clogging of the passages. This also necessitates the provision of an automatic pressure control system for instance, using known pressure sensor valves, which increases, to a very considerable extent, the cost of installation of such irrigation systems, as well as the cost of maintenance and operation thereof.

BRIEF SUMMARY OF THE INVENTION

Having in mind the defects of the prior art drip irrigation systems, it is an object of the present invention to provide an integral drip irrigation system, of the type having pressure dissipating passages, which will solve all the problems of the prior art drip irrigation systems and particularly the problems consisting of clogging of the passages by entrance of foreign matter and variation of the emitted flow of liquid, and that, at the same time, will be of a very simple and economical construction and will be capable of being manufactured by simple continuous manufacturing processes.

Another object of the present invention is to provide an integral drip irrigation system of the above mentioned character, which will integrally contain therein a filtration system for the irrigation liquid prior to the entrance to the pressure dissipating passages.

Still another object of the present invention is to provide an integral drip irrigation system of the above mentioned character, which will provide for compensating the variations of the pressure of the irrigation liquid in the main passages in order to avoid variation in the flow of liquid emitted by the passages.

One more object of the present invention is to provide an integral drip irrigation system of the above mentioned nature, which will be adequate for utilization either adhered in the form of an insert on an existing drip irrigation piping or as an independent flexible pipe by means of the mere wrapping of the system over itself and thermal sealing of its side extreme edges.

Still another object of the present invention is to provide an integral drip irrigation system of the above mentioned characteristics, which in its design will provide the possibility of arranging the admission zones at the top of the pipe circumference in order to avoid entrance of foreign matter, whereas the emitter zones are arranged at the bottom of the circumference of the pipe for discharging the liquid downwardly.

A more particular object of the present invention is to provide an integral drip irrigation system of the above described character, which will be provided with closed exits at the emitter points, which closed exits may be opened at the will of the user and in the necessary points, leaving the remainder closed in order to distribute the irrigation liquid in conformity with the density of the related crop.

It is another object of the present invention to provide an integral drip irrigation system of the above mentioned character, which may be manufactured by means of simple processes through molding and lamination of a pair of flexible plastic sheets adhered to each other.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a fragmentary, extended and partially cut out view to show the laminated construction thereof, of a laminate which comprises an integral drip irrigation system in accordance with the preferred embodiment of the present invention, in which all the channels forming the system are suitably embossed in one of two sheets forming said laminate;

FIG. 2 is an elevational cross sectional view, taken along lines 2—2 of FIG. 1 and looking in the direction of the arrows;

FIG. 3 is an elevational cross sectional view taken along lines 3—3 of FIG. 1 and looking in the direction of the arrows;

FIG. 10 is a fragmentary view, partially cut out to show inner details thereof, of an integral drip irrigation system built in accordance with still another embodiment of the present invention and comprising an independent laminate manufactured by the blister method, which may be converted into a flexible pipe with its drip irrigation passages integrally built therein, the same as in FIG. 1;

FIG. 11 is an elevational cross sectional view taken along lines 11—11 of FIG. 10 and looking in the direction of the arrows;

DETAILED DESCRIPTION

Figure 4:
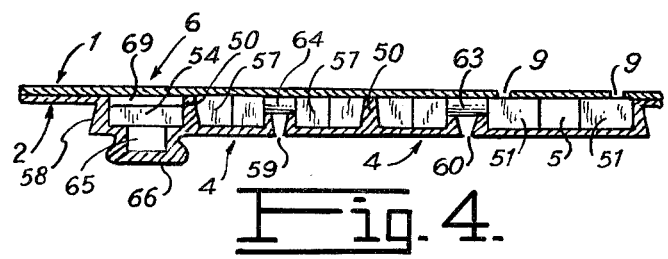
FIG. 4 is a fragmentary elevational cross sectional view taken along lines 4—4 of FIG. 1 and looking in the direction of the arrows.

Having now more particular reference to the drawings and more specifically to FIGS. 1 to 7 thereof, the integral drip irrigation system built in accordance with the preferred embodiment of the present invention, basically comprises a laminate formed by a pair of elongated plastic sheets 1 and 2, with sheet 1 being flat throughout its body, whereas sheet 2 is suitably embossed or deformed in order to constitute winding channels that are generally indicated by means of the reference character 4, as well as a collector channel which is indicated generally by means of the reference numeral 5, said winding channels 4 being suitably distributed throughout the width and the length of the laminate and containing therein the pressure compensating devices which are at the discharge sections 6 thereof, while the said collector channel, which may be one or more channels depending on the design of the laminate, contains along the same the integral filtration system for irrigation liquid in accordance with the present invention, in order to avoid entrance of foreign matter to the passages 4 in conformity with what will be described in more detail hereinbelow and such as it can be clearly seen in FIG. 1 of the drawings.

In the preferred embodiment of the present invention which is illustrated in FIGS. 1 through 8 of the drawings, the integral drip irrigation system substantially comprises an admission or collector device 5 which has the form of a longitudinal channel defined by the bottom of the plastic sheet 2, the longitudinal embossed partitions 60 and 61, and the flat sheet 1 which closes the device, said collector 5 extending throughout the length of the laminate (and thus the piping) as it can be clearly seen in FIG. 1 of the drawings. While in this figure there has been shown one single collector 5, anyone skilled in the art may be able to easily design different arrangements containing several collectors and different designs and arrangements of the channels 14 without thereby departing from the true scope and spirit of the present invention.

Collector 5, in accordance with the embodiment illustrated in FIG. 1 of the drawings, is provided with a plurality of transverse partitions 51 which originate at the inner walls of the longitudinal partitions 60 and 61, respectively, colinearly to each other throughout the length of the collector, in order to support the continuous slits 9 which are opened at the indicated positions through the flat sheet 1 covering the collector 5, such that the liquid running through the pipe which will be formed with the system illustrated in FIG. 1 by means of wrapping the same in the direction pointed by the curved arrows in FIGS. 2 and 3, or in the opposite direction, will pass through the thin slits 9, leaving the foreign solid matter out of the collector 5, inasmuch as said slit 9 exerts a very efficient filtrating action by virtue of its small width to thereby admit an irrigation liquid which is perfectly free from solid matter into the collector 5 which will convey said liquid into the channels 4 which will be described hereinbelow.

Figure 8:
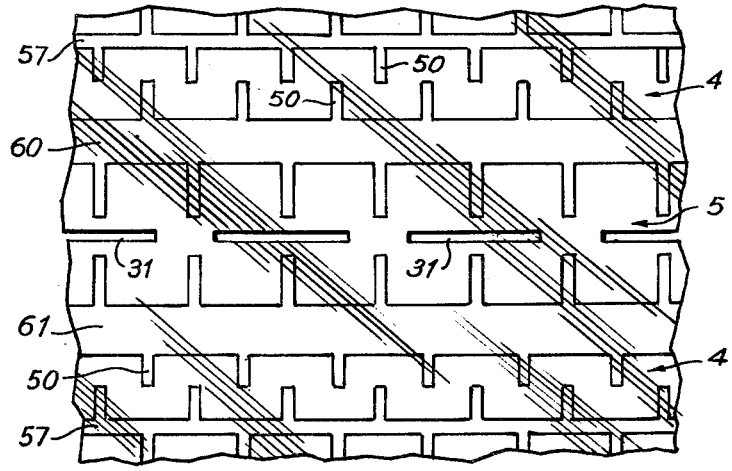
FIG. 8 is a fragmentary view of the center area of the laminate shown in FIG. 1 but illustrating a collector channel built in accordance with a second embodiment of the present invention.

In the above respect, it will be clearly apparent to anyone skilled in the art, that collector 5 may be built merely as a continuous channel without any transverse partition 51 such as it is illustrated in FIG. 8 of the drawings and that in such instance the slits 9 will be replaced by a plurality of intermittent slits 31, very thin and in any number, arrangement and shape, in order to constitute the filtration device of the system of the present invention, to avoid entrance of foreign solid matter into the collector 5.

As a very important aspect of the present invention, when the pipe is formed by wrapping the above described laminate over itself, it is preferred to leave collector 5 at the top of the circumference of the pipe in order to provide for the entrance of the water or irrigation liquid into said collector in a vertically upwardly stream, whereby all the foreign matter filtered by the slits 9 or the openings 31 will again fall down into the liquid body and will be entrained thereby without any tendency of the filtrating system 9 or 31 in accordance with the present invention to become clogged. This fully solves the problems confronted up to now in the practice of drip irrigation, namely, that the passages are frequently obstructed by virtue of the fact that entrance of solid foreign matter is allowed which, therefore, requires the provision of separate filtration systems at an elevated cost.

Collector 5 communicates with a plurality of winding channels 4 for reducing the pressure, and that may be distributed at each side of the collector as illustrated in FIG. 1, but that may also be arranged in any length or in any number and that, in accordance with the merely illustrative embodiment of FIGS. 1 to 7 of the drawings, comprises channels 4 which first or forward stretch or length is defined at the other side of longitudinal partition 60 of collector 5, between said partition and an intermediate thinner partition indicated by means of the general reference number 57; the second or backward stretch or length of channel 4 is defined between said partition 57 and a longitudinal partition 59 which will be described in more detail hereinbelow; the third or forward stretch or length will be defined between said partition 59 and a new partition 57, whereas the last or backward stretch or length will be defined between said partition 57 and a partition 58 which will also be defined in more detail hereinbelow. Along the length of each channel 4 a series of transverse partitions 50 is arranged for covering only partially the width of the channel and alternately arranged on the side partitions so that they will be spaced and overlapped, thus forming a winding course or path for the irrigation liquid.

As at the other side of the partition 61 of collector 5 there are formed four channel stretches in accordance with the particular embodiment illustrated in FIG. 1, defined between the several partitions 57 and the respective partitions 61, 62 and 58, respectively, the flow of the irrigation liquid through said channels, may be explained by having reference to only one of the two side portions, inasmuch as they are entirely mirror images of each other and it is not felt necessary to repeat the description thereof.

The stretches of the channels that correspond to each one of the integral emitters are defined between each pair of transverse partitions 52 and 53 along the laminate, such as is clearly illustrated in FIG. 1 of the drawings and the flow of the irrigation liquid is effected from the collector 5 into the first stretch of channel 4 through a groove 63 provided at the longitudinal partition 60 or 61, to thereafter move forwardly to the opposite length of the forward first stretch and return through the backward second stretch, in order to pass to the forward third stretch through another groove 64 provided at the partition 59 or at the partition 62, as the case may be, and thence the operation is repeated so that the fluid will flow along the backward fourth or last stretch of the passage 4, to reach the emitter device 6, which comprises a chamber 71 formed between the last incomplete partition 50 and a complete partition 55 which is lower in its height than partitions 50, 58 and 57 for an objective that will be more clearly seen hereinbelow. The irrigation liquid, therefore, will pass between the upper edge of partition 55 and the inner face of the flat sheet 1 into chamber 72, and from there, also between the upper edge of a complete partition 54 of height equivalent to partition 55 and the flat sheet 1, into chamber 73 which contains the exit opening 65 which will be described with more detail hereinbelow.

As all the channels formed in the laminate of the present invention by the provision of an array of obstructing transverse partitions 50, perform in identical manner, it is not considered necessary to repeat the above description and the only matter that must be pointed out is that said channels 4 may adopt any shape, that is, they may be constituted by a single longitudinal length or they may be constituted by a plurality of forward and backward flow stretches and they may be arranged in any other form or disposition, provided that each channel be communicated with the collector 5 in order to receive irrigation liquid filtrated by the filtration system 9 or 31 and in order to deliver said filtrated liquid, upon reduction of its pressure through impacts and direction changes against the partitions 50, into the discharge chamber 73 of the emitter 6 to permit the liquid to flow out through opening 65 as has been clearly illustrated in FIGS. 1 to 7 of the drawings.

Figure 5:
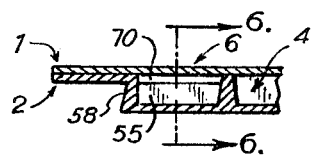
FIG. 5 is an elevational cross sectional detailed view, taken along lines 5—5 of FIG. 1 and looking in the direction of the arrows.

In FIG. 5 the chamber 72 and its transverse partition 55 are clearly illustrated and it can be seen that, between the upper edge of partition 55 and the inner face of the flat sheet 1, there is a gap 70 which provides communication between chambers 72 and 71 of each emitter device, in order to permit the liquid to pass through said gap 70 from one chamber to the other. Also, as illustrated in FIG. 4 of the drawings, chamber 73 with its transverse partition 54 provides, between the upper edge of the latter and the inner face of sheet 1, an upper gap 69 which provides communication between chambers 73 and 72 for a purpose which must be more clearly apparent hereinbelow. The exit opening 65 is arranged at the bottom of chamber 73, said opening being normally covered by an integral plug 66 when the laminate is manufactured, said plug comprising, as it may be more clearly seen in FIG. 6 of the drawings, a button 67 and a neck 68 which permits said button 67 to be cut out by means of a knife or any other cutting device, in order to leave the exit opening 65 fully opened as illustrated in FIG. 7 of the drawings.

Figure 6:
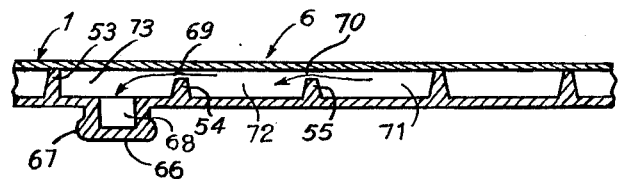
FIG. 6 is a fragmentary cross sectional view taken along lines 6—6 of FIG. 5 and looking in the direction of the arrows, to show the pressure compensating device of the irrigation system in accordance with the preferred embodiment of the present invention.
Figure 7:
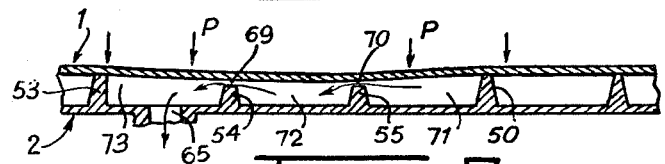
FIG. 7 is a view similar to FIG. 6 but showing the action of the pressure compensating device when a pressure is exerted thereon and also showing its exit opening suitably cut out.

The function of the pressure compensating device which is provided at the emitter 6 and is illustrated in FIGS. 6 and 7, is as follows. Having been reduced by friction losses throughout the length of the corresponding winding passage 4, the pressure of said irrigation liquid at the emitter 6 is considerably lower than the pressure of the irrigation liquid that runs through the pipe formed by the laminate as explained above. Therefore, when the pressure in the pipe increases or decreases, the section of the flat sheet 1 which spans the chambers between partitions 50 and 53 acts as a diaphragm such that, when an excessive pressure P is applied as illustrated in FIG. 7 of the drawings, sheet 1 will tend to close the gaps 60 and 70 of partitions 54 and 55, respectively, thereby reducing the cross-sectional area of the outlet and therefore constituting a very efficient pressure regulator that will avoid fluctuations in the volumes of irrigation liquid emitted through the emitters when the pressure in the interior of the piping varies. With the above, another of the traditional problems presented by the prior art irrigation liquid systems, namely, the lack of control of the flow caused by pressure variations, is completely solved.

Such as it may be clearly seen in FIGS. 2 and 3 of the accompanying drawings, partitions 58, 59, 60, 61 and 62 which define both the collector 5 and the channels 4, are formed by means of embossing the plastic sheet 2 in order to form trapezoidal grooves that will facilitate the wrapping of the laminate in the direction of the curve arrows illustrated in FIGS. 2 and 3, in order to form a pipe of approximately circular cross-section by means of the overlapping of the side flaps 3 of said laminate and the adhesion thereof by means of heat and pressure, such that, when said laminate is wrapped to form a pipe, the grooves 58, 59, 60, 61 and 62 will be arranged in a straight shape which will avoid undue strain in the finished pipe. Of course that it will be clearly apparent to anyone skilled in the art, that the trapezoidal grooves described above may have the reverse shape as compared to that illustrated in the embodiments of FIGS. 2 and 3, that is, with their end open upwardly, in order to provide for the wrapping of the laminate in the direction opposite to that indicated by the curved arrows, such that the flat sheet 1 will be at the outer part and the embossed sheet 2 will be at the inner part of the wrapped pipe, thereby modifying the device such that the filtrating slits 9 or 31 will be provided at the bottom of sheet 2, whereas the emitter openings 65 will be provided in sheet 1.

It is to be pointed out that the provision of the laminate containing the integral drip irrigation system of the present invention with the emitters having their outlets 65 covered by means of the plugs 66, presents considerable commercial advantages, inasmuch as the user merely needs to cut out the buttons 67 through the necks 68 of the outlets 65 that he may require, consistently with the disposition of the plants in the field or farm, which prevents the waste of water, being kept fully closed in all other places.

As clearly illustrated in FIG. 9 of the drawings, both the integral drip irrigation system described above and illustrated in FIGS. 1 to 8, and the system that will be described hereinbelow, may be used as integrated systems for forming the irrigation piping in themselves by the mere wrapping of the laminate. However, it must be pointed out that said systems may also be used in the form of elongated ribbons which may be adhered to an existing irrigation piping, which renders the irrigation systems of the present invention remarkably versatile.

Figure 9:
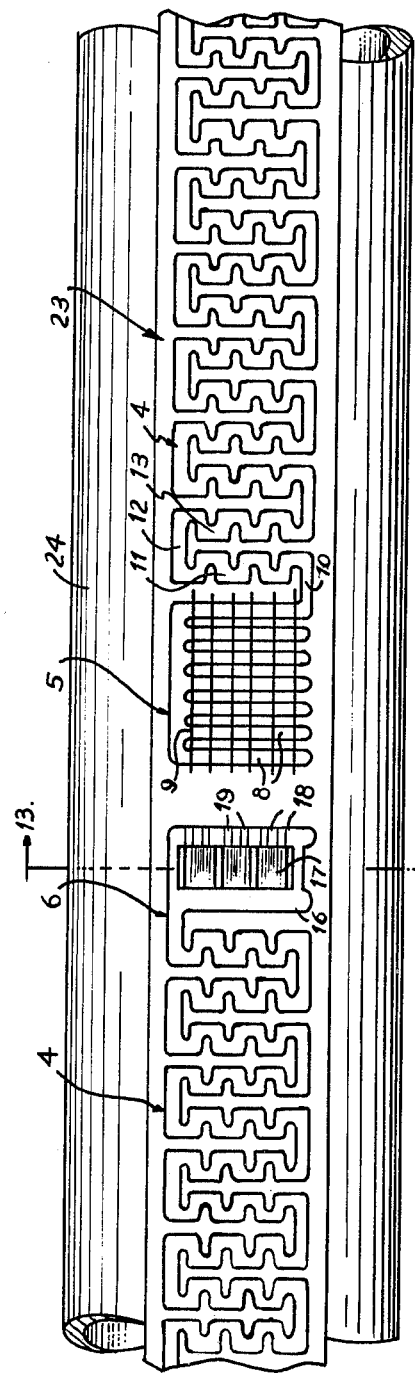
FIG. 9 is a view of a drip irrigation system built in accordance with still another embodiment of the present invention, in the form of a continuous ribbon containing passages, embossed in the laminate by means of the blister method and adhered to an existing drip irrigation piping.

In FIGS. 9 through 11 of the drawings there are illustrated certain other particularly useful embodiments of the present invention, wherein the drip irrigation systems are manufactured also from a pair of plastic sheets 1 and 2, but by means of the "blister" method, in order to provide the winding channels 4 suitably embossed in the thermally deformed sheet 2, such as is clearly illustrated particularly in FIGS. 9 to 11 of said drawings.

In the embodiment particularly illustrated in FIG. 9, a ribbon 23 is formed from the laminate in accordance with the blister method to provide the channels 4, and said laminate 23 is adhered to an existing irrigation pipe 24, whereby the ribbon 23 will extend through the length of said pipe and the collector devices 5 will be arranged next to the emitters 6 to space each channel 4.

In the embodiment illustrated in FIGS. 10 and 11, the system is identical with the system of FIG. 9, but in this case the collector 5 is provided by means of a pair of channels 32 and 33, communicated by means of the transverse channels 34 at spaced lengths and the filtration system is provided by means of the plurality of slits 31 described above in connection with FIG. 8, to avoid the entrance of foreign matter into the channels 32 and 33. From said channels 32 and 33 forming the collector 5, the irrigation liquid is transferred through transverse channels 35 to feed said irrigation liquid to the lengths 11 of the winding channel 4, to thereafter deliver it, through the longitudinal communication 12, to a length of opposite direction 13, as clearly illustrated in any of FIGS. 9, 10 and 11.

The collector devices 5 of the embodiment of FIG. 9, however, differ from the above design, while working under the same principle, inasmuch as they are formed by means of a longitudinal channel 7 communicated along its length with a plurality of transverse channels 8, all of them embossed by means of thermal deformation of sheet 2, in order to constitute a comb-like device, whereas sheet 1 has, at the area corresponding to the admission comb-like collector 5, a plurality of elongate slits such as illustrated at 9 in FIG. 9, to admit water or irrigation liquid for the above described purposes. From the last arm 8 of the comb-like collector, a longitudinal chamber 10 extends to feed the irrigation liquid to the first ascending stretch 11 of the winding channel 4 to thereafter pass through the longitudinal stretch 12 and finally flow through the descending stretch 13 of said channel to continue flowing along the same for the purposes of reducing the pressure as described above.

The pressure compensating device of the embodiments illustrated in FIGS. 9 to 11 of the drawings, while working under the same principles of the pressure compensating device described in relation to the embodiments of FIGS. 1 to 8 of said drawings, differs in that it adopts the form of a ladder, illustrated by means of reference number 6 in FIGS. 9 and 10, which communicates by means of a longitudinal channel 15 with the discharge end of channel 4 and comprises substantially a transverse channel 16, approximately of the same width as the passage 4, through which a plurality of crosswisely directed channels 17 extend, said channels 17 having a larger width and communicating with another channel 18, parallel to channel 16, in order to form said ladder-like device, such that all the irrigation liquid discharged by the channel 15 will pass through the channel 16 and thence, through the channels 17 into the channel 18, wherein a plurality of slits 19 is provided along the same, in order to discharge the drip irrigation liquid through said slits which thereby constitute an emitter.

Figure 13:
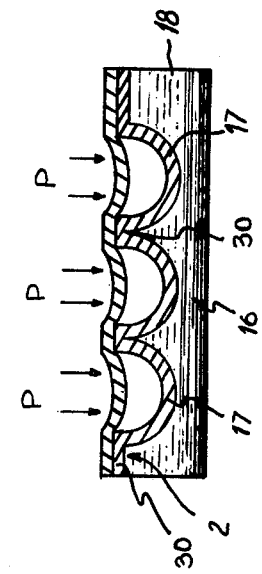
FIG. 13 is an elevational cross sectional view taken along lines 13—13 of FIG. 12 and looking in the direction of the arrows.
Figure 12:
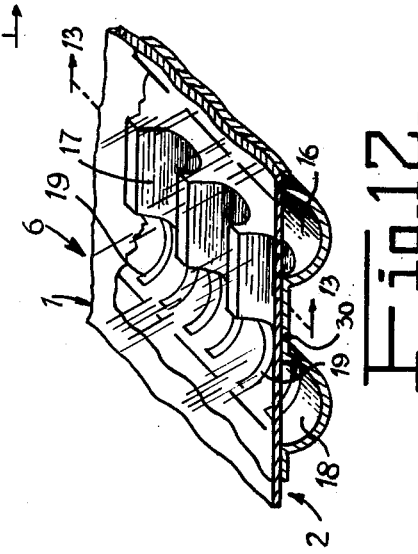
FIG. 12 is a perspective fragmentary view, partially cut out to show inner details thereof, of the discharge and pressure compensating element used in the system illustrated in accordance with the embodiments of FIGS. 9 and 10.

The pressure compensator works by virtue of the fact that the sheet 1 provides a sort of a diaphragm on each one of channels 17 which permit communication between the transverse channel 16 and the discharge channel 18, such as clearly illustrated in FIGS. 12 and 13 of the drawings, whereby, when pressure P of the interior of the conducting pipe increases, the sheet 1 will be flexed down as illustrated in FIG. 13, thereby partially closing the channels 17 which are joined at their side edges to the sheet 1 by means of the portions 30, to thus compensate for the fluctuations in the pressure, decreasing the flow when the pressure increases and increasing the same when the pressure decreases, in order to maintain a constant volumetric flow as described above in connection with the embodiments of FIGS. 1 to 8 of the drawings.

It thus may be seen that for the first time an integral drip irrigation system has been provided, formed by a mere molded laminate of plastic material, which shows considerable advantages as compared to the prior art devices, inasmuch as, due to its flexible nature, it may be transported and stored efficiently and also due to said flexibility, presents the characteristic of constituting a pressure regulator diaphragm in the sections for emitting the drip irrigation liquid, whereby the discharge thereof will be practically constant regardless of the feed pressure of the irrigation liquid to the pipe.

The general structure of the integral drip irrigation system built in accordance with the present invention, formed of a laminate of a pair of plastic sheets, one of which is thermally and permanently deformed to provide all the desired channels, remarkably facilitates the manufacture of said system, thereby enabling its production in continuous and very simple machines.

Another particularly important advantage of the integral drip irrigation system in accordance with the present invention resides on the fact that, as the collector portions of the device are provided with slits for admitting the drip irrigation liquid, and as said slits are provided in a flexible sheet, said slits may be made as thin as desirable, thereby providing a filtration means which avoids the entrance of any foreign solid material to the passages, without the need of providing costly separate filtrations systems for the drip irrigation liquid as was the case of the prior art drip irrigation systems.

On the other hand, by providing the discharge openings in the emitter devices of the irrigation system in a closed condition, a better distribution of the drip irrigation liquid discharge is allowed by virtue of the fact that the users may open the outlets only at the desired points, which also prevents the waste of considerable volumes of irrigation liquid.

Although in the above there have been shown and described certain specific embodiments of the present invention, it is to be understood that many modifications thereof are possible. The present invention, therefore, is not to be restricted except insofar as is necessitated by the prior art and by the spirit of the appended claims.

What is claimed is:

1. An integral drip irrigation system of the type comprising an elongated laminate forming an integral part of a piping for carrying irrigation liquid and constituted by a flexible plastic sheet, thermally deformed to provide a plurality of cavities therein and a flat flexible plastic sheet adhered to said deformed sheet at the most prominent areas thereof to complete passages and chambers with said cavities, said passages and chambers comprising at least one elongated winding passage running along the laminate; at least one irrigation liquid admission zone capable of receiving said liquid from said pipe and feed it to said at least one winding passage through one end thereof; at least one discharge zone capable of receiving the irrigation liquid delivered through the opposite end of said at least one winding passage and controlledly discharging it outwardly of the laminate; and emitter opening provided on one of the faces of the laminate at said at least one discharge zone; an integrated filtration system for the irrigation liquid which comprises at least a thin slit for retaining solids, provided in said laminate at the face opposite the face containing said discharge opening and coincident with said at least one admission zone; and an integrated pressure compensating system comprising a non-supported area of said flat sheet, spanning at least one discharge zone, so that when the pressure in the pipe increases the non-supported area of said flat sheet acts as a compensating diaphragm by controlledly narrowing the cross sectional area of said at least one discharge zone in proportion to the increase of the pressure in the piping for carrying the irrigation liquid.

2. An integral drip irrigation system according to claim 1 wherein said thermally deformed flexible plastic sheet comprises a flat strip from one of which surfaces a plurality of upstanding partitions extends, said passages and chambers being formed between said upstanding partitions.

3. An integral drip irrigation system according to claim 1 wherein said thermally deformed flexible plastic sheet comprises a sheet containing blister type depressions for forming said passages and chambers.

4. An integral drip irrigation system according to claim 2, wherein said laminate contains a plurality of said winding passages, continuously arranged throughout the length thereof; each winding passage being formed by a pair of longitudinal side partitions, from which incomplete transverse partitions extend, the latter alternately extending perpendicularly from one and the other longitudinal partitions so as to form a winding path for the irrigation liquid; said liquid admission zone comprising at least one longitudinal channel running continuously throughout the length of the laminate between a pair of passage-forming longitudinal partitions, a plurality of grooves being provided through said pair of passage-forming longitudinal partitions running along the sides of said longitudinal channel, to alternately cross one and the other of said pair of longitudinal partitions, to communicate said channel with each entrance end of each winding passage in order to feed irrigation liquid thereto; a plurality of thin slits arranged along said longitudinal channel in order to form said integrated filtration system; said discharge zone for each winding passage comprising a first chamber formed between the last of said incomplete partitions of each winding passage and a first transverse control partition, said control partition extending between the two side partitions of said passage and with its upper edge lower than the upper edge of said side partitions in order to leave a gap between the upper edge thereof and the inner face of said flat flexible sheet, a second chamber formed between said first control partition and a second transverse control partition spaced from said first control partition and identical thereto, and a third chamber formed between said second control partition and a transverse obturating partition which marks the end of the passage, whereby the area of said flat sheet spanning said chambers will be arranged in the manner of a diaphragm over said chambers, which diaphragm is capable of opening and closing the gaps between said first and second control partitions and the flat sheet in response to the pressure on the other side of the diaphragm, said third chamber being provided with a discharge opening to discharge the irrigation liquid outwardly of the laminate.

5. An integral drip irrigation system according to claim 4 wherein each one of said winding passages is formed by forward and backward stretches containing common longitudinal partitions, in order to distribute the discharge openings with less spacing one from the other.

6. An integral drip irrigation system according to claim 5 wherein each one of said discharge opening is closed by means of an integral plug capable of being cut out to open the discharge zones at the desired places while the remainder is left closed.

7. An integral drip irrigation system according to claim 4 wherein said integrated filtration system comprises a plurality of transverse partitions, equidistantly arranged along each admission channel-forming longitudinal partition, and a pair of continuous slits extending parallelly to said longitudinal partitions and crossing said transverse partitions, whereby between each pair of transverse partitions, said slits will be capable of being opened to an extent sufficient to permit the passage of irrigation liquid, but insufficient to permit the passage of solid matter.

8. An integral drip irrigation system according to claim 4 wherein said integrated filtration system comprises at least one series of colinear spaced slits arranged along the longitudinal channel comprising the admission zone.

9. An integral drip irrigation system according to claim 3 wherein said laminate contains a plurality of said winding passages continuously arranged throughout the length thereof; each winding passage being formed by an elongated blister-type channel arranged in a zig-zag manner; each one of said winding passages is associated with an admission zone comprising an elongated longitudinal blister-type channel and a plurality of elongated transverse blister-type channels which terminate in said longitudinal blister-type channel to form a comb-like device, a plurality of thin slits being provided parallely to said longitudinal blister-type channel and over said transverse blister-type channels, said slits being provided through said flat flexible sheet in order to serve as an integrated filtration system; each one of said winding passages being associated with a discharge zone which comprises a first transverse elongated blister-type channel, a second transverse elongated blister-type channel parallel to and spaced from said first transverse blister-type channel and a plurality of longitudinal blister-type channels communicating said first and second transverse blister-type channels, thereby forming a discharge device having the shape of a ladder, such that the area of said flat flexible sheet spanning said longitudinal blister-type channels will be arranged in the manner of a diaphragm over said longitudinal blister-type channels, in order to close or open the cross sectional area thereof in response to the pressure on the other side of the diaphragm, said second transverse blister-type channel being provided with a plurality of discharge openings to discharge the irrigation liquid outwardly of the laminate.

10. An integral drip irrigation system according to claim 1 wherein said laminate is provided with a pair of continuous longitudinal side flaps in order to permit said laminate to be wrapped around itself to place each flap overlapped to each other, thus being capable of permitting sealing of said flaps in order to form in itself the piping for conducting the drip irrigation liquid.

11. An integral drip irrigation system according to claim 1 wherein said laminate is in the form of an elongated ribbon and is adhered to a drip irrigation pipe on the outer face thereof, openings being provided through said pipe to match the integral filtration elements of said ribbon.

* * * * *